United States Patent
Ellae et al.

(10) Patent No.: US 9,948,327 B2
(45) Date of Patent: Apr. 17, 2018

(54) FRONT END CIRCUIT AND METHOD OF OPERATING A FRONT END CIRCUIT

(71) Applicant: Snaptrack Inc., San Diego, CA (US)

(72) Inventors: Juha Ellae, Halikko (FI); Edgar Schmidhammer, Stein An der Traun (DE)

(73) Assignee: SnapTrack, Inc., San Diego, CA (US)

( * ) Notice: Subject to any disclaimer, the term of this patent is extended or adjusted under 35 U.S.C. 154(b) by 43 days.

(21) Appl. No.: 15/102,858

(22) PCT Filed: Dec. 11, 2013

(86) PCT No.: PCT/EP2013/076246
§ 371 (c)(1),
(2) Date: Jun. 8, 2016

(87) PCT Pub. No.: WO2015/086065
PCT Pub. Date: Jun. 18, 2015

(65) Prior Publication Data
US 2016/0359506 A1    Dec. 8, 2016

(51) Int. Cl.
*H04L 5/00*    (2006.01)
*H04B 1/00*    (2006.01)
*H04B 1/52*    (2015.01)
*H04L 5/14*    (2006.01)

(52) U.S. Cl.
CPC .............. *H04B 1/0057* (2013.01); *H04B 1/52* (2013.01); *H04L 5/14* (2013.01)

(58) Field of Classification Search
CPC .......... H04B 1/0057; H04B 1/52; H04B 1/56; H04B 1/00; H04B 1/406; H04B 1/44; H04B 1/006; H04B 1/005; H04B 1/26; H04B 1/525; H04L 5/14
See application file for complete search history.

(56) References Cited

U.S. PATENT DOCUMENTS

| | | | |
|---|---|---|---|
| 7,126,440 B2 * | 10/2006 | Bradley | H04B 1/0057 333/126 |
| 8,369,250 B1 * | 2/2013 | Khlat | H04L 5/14 370/280 |
| 2004/0257172 A1 * | 12/2004 | Schmidhammer | H03H 9/0038 333/133 |

(Continued)

FOREIGN PATENT DOCUMENTS

| | | |
|---|---|---|
| EP | 1755230 A2 | 2/2007 |
| EP | 2073394 A1 | 6/2009 |

(Continued)

OTHER PUBLICATIONS

International Search Report and Written Opinion—PCT/EP2013/076246—ISA/EPO—dated Jun. 6, 2014.

*Primary Examiner* — Mohamed Kamara
(74) *Attorney, Agent, or Firm* — Patterson & Sheridan, L.L.P

(57) ABSTRACT

The present invention concerns a front end circuit (1) which comprising a first tunable duplexer (5) comprising a first tunable RX bandpass filter (9) and a first tunable TX bandpass filter (10), wherein the first tunable duplexer (5) is configured to support a first FDD mode in a first FDD frequency band and a first TDD mode in a first TDD frequency band. Furthermore, the present invention concerns a method of operating the front end circuit.

17 Claims, 5 Drawing Sheets

(56) References Cited

U.S. PATENT DOCUMENTS

Figure 1:
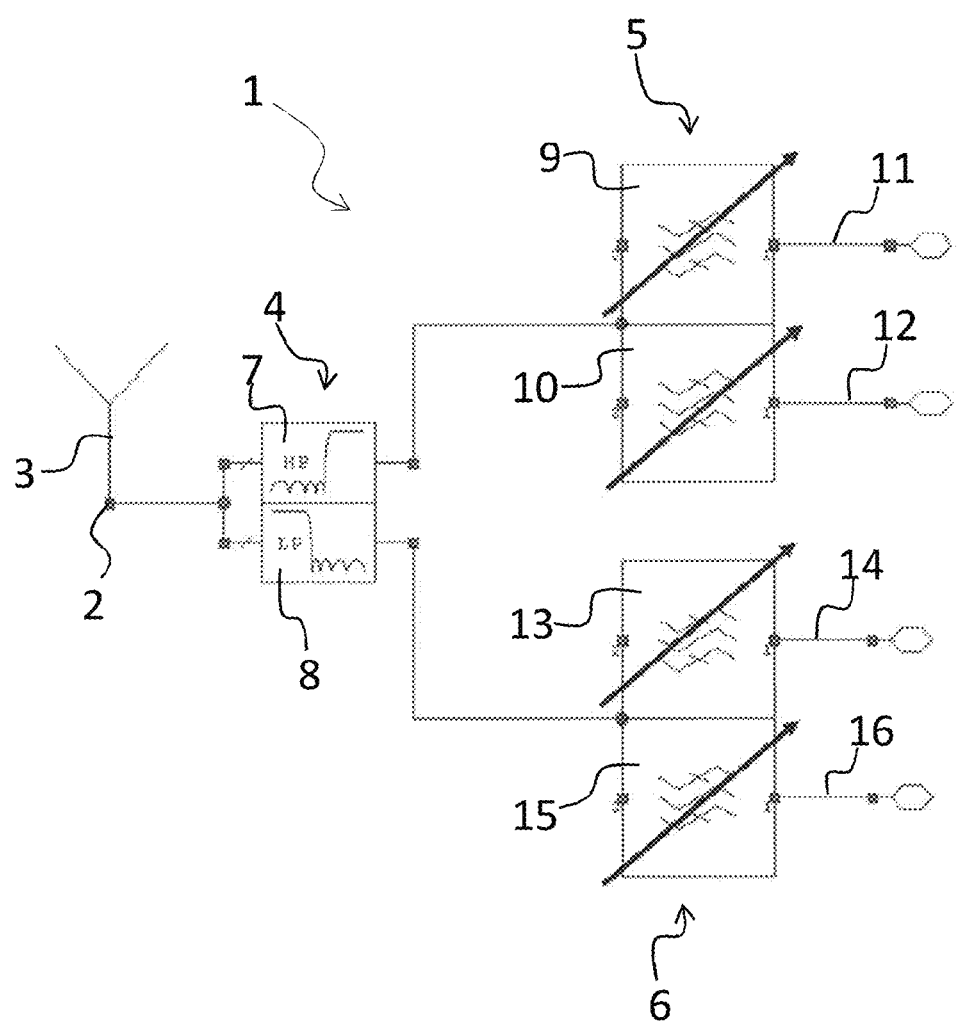

| | | |
|---|---|---|
| 2007/0042802 A1 | 2/2007 | Park et al. |
| 2009/0286501 A1 | 11/2009 | Rousu et al. |
| 2014/0038531 A1 | 2/2014 | Hayafuji et al. |
| 2014/0119244 A1* | 5/2014 | Steer ............... H04B 1/525 370/278 |
| 2014/0295775 A1* | 10/2014 | Rousu ............... H04B 1/006 455/73 |

FOREIGN PATENT DOCUMENTS

| | | |
|---|---|---|
| WO | 2012140969 A1 | 10/2012 |
| WO | 2013041146 A1 | 3/2013 |

* cited by examiner

FRONT END CIRCUIT AND METHOD OF OPERATING A FRONT END CIRCUIT

The present invention concerns a front end circuit and a method of operating a front end circuit. The front end circuit may be used in a mobile phone, for example.

Today's mobile phones often support TDD (time division duplexing) and FDD (frequency division duplexing) at different frequency bands so that access to fast data transfer is available irrespective of a user's geographical location. Different countries have allocated different frequency bands for cellular use. To support different bands and both TDD and FDD type systems, the front end circuits of cellular phones have to be very complex. Typical architectures require a large number of filters and switches.

It is an object of the present invention to provide a front end circuit with a reduced number of components supporting different operational modes in different frequency bands. This object is solved by the front end circuit according to present claim 1. Moreover, the second independent claim solves the object to provide a method for an optimized operation of a front end circuit.

According to a first aspect of the present invention, a front end circuit is provided which comprises a first tunable duplexer comprising a first tunable RX bandpass filter and a first tunable TX bandpass filter wherein the first tunable duplexer is configured to support a first FDD mode in a first FDD frequency band and a first TDD mode in a first TDD frequency band.

The same filters, i.e. the first tunable RX bandpass filter and the first tunable TX bandpass filter, are used to support both FDD-type duplexing and TDD-type duplexing. Switches, which are usually required for TDD duplexing, are not necessary for the present front end circuit. In particular, in the TDD mode, the first tuneable duplexer can be tuned such that it can be utilized as a RX bandpass filter and as a TX bandpass filter depending on the RX/TX timing of the TDD signal.

A tunable bandpass filter is defined as a filter which can be tuned or reconfigured such that its passband is amended. In particular, the tunable bandpass filter can be optimized to different frequency bands. Thus, the tunable bandpass filter is configured to allow operating in multiple frequency bands, wherein the filter is tuned to one of said multiple frequency bands at any given time.

The tunable bandpass filter may comprise tunable discrete elements, e.g. a tunable capacitor and/or a tunable inductor. Additionally or alternatively, the tunable bandpass filter may comprise at least one tunable acoustic element.

The first TDD frequency band can be overlapping with the first FDD frequency band. In particular, the first TDD frequency band can be identical with the first FDD frequency band. However, the first TDD frequency band can also be different from the first FDD frequency band.

Each of the first FDD frequency band and the first TDD frequency band can be a frequency band as defined in the LTE standard or in other frequency standards used for cellular phones.

The first tunable duplexer may be configured such that, in the first TDD mode, the first tunable duplexer is configured to alternate between a TX setting and a RX setting.

Further, the first TDD mode may also have a TX mode and a RX mode. The first tunable duplexer may be configured to switch to its TX setting in the TX mode of the first TDD mode. Further, the first tunable duplexer may be configured to switch to its TX setting in the RX mode of the first TDD mode.

In particular, in the first TDD mode, one of the first tunable RX bandpass filter and the first tunable TX bandpass filter may be optimized to the first TDD frequency band and the other of the first tunable RX bandpass filter and the first tunable TX bandpass filter may be detuned such that it does not have a passband in the first TDD frequency band.

In the TX mode, the duplexer may send signals in the first TDD frequency band. Thus, in the TX mode of the first TDD mode, the first tunable TX bandpass filter may be optimized to the first TDD frequency band and the first tunable RX bandpass filter may be detuned such that it does not have a passband in the first TDD frequency band in the RX mode of the first TDD mode. This setting of the duplexer is also referred to as the TX setting.

In the RX mode, the duplexer is configured to receive signals in the same frequency band. The first tunable RX bandpass filter may be optimized to the first TDD frequency band in the RX mode of the first TDD mode and the first tunable TX bandpass filter may be detuned such that it does not have a passband in the first TDD frequency band in the RX mode of the first TDD mode. This setting of the duplexer is also referred to as the RX setting.

Further, the first tunable duplexer may be configured such that the first tunable TX bandpass filter and the first tunable RX bandpass filter are never tuned to the same bandpass simultaneously. Thereby, it is prevented that a strong signal in a TX path may pass through the first tunable RX bandpass filter and damage elements of an RX circuit which may be connected to the first tunable RX bandpass filter.

Moreover, the first tunable duplexer may be configured such that, in the first FDD mode, the first tunable RX bandpass filter and the first tunable TX bandpass filter are optimized to the first FDD frequency band.

Moreover, the first tunable duplexer may be configured to support at least a second FDD mode in a second FDD frequency band. In particular, the second FDD frequency band may be different from the first FDD frequency band. The second FDD frequency band may be a frequency band defined according to the LTE standard or according to other frequency standards common for cellular phones.

The tunable RX bandpass filter and the tunable TX bandpass filter are configured such that they can be optimized to one of the first or to the second FDD frequency band. Moreover, the tunable duplexer may also support FDD duplexing in further FDD frequency bands.

The first tunable duplexer may be configured to support at least a second TDD mode in a second TDD frequency band. The second TDD frequency band may be overlapping with the second FDD frequency band. However, the second TDD frequency band may also be different from the second FDD frequency band. The second TDD frequency is different from the first TDD frequency band. In particular, the first tunable duplexer is configured to support different TDD modes having different TDD frequency bands, wherein one TDD mode is supported at a time.

In the second TDD mode, the first duplexer may also be configured to alternate between the TX setting and the RX setting. Here, in the TX setting, the first tunable TX bandpass filter may be optimized to the second TDD frequency band and the first tunable RX bandpass filter may be detuned such that it does not have a passband in the second TDD frequency band. Correspondingly, in the RX setting, the first tunable RX bandpass filter may be optimized to the second TDD frequency band and the first tunable TX bandpass filter may be detuned such that it does not have a passband in the second TDD frequency band.

In one embodiment, the front end circuit may further comprise a second tunable duplexer comprising a second tunable RX bandpass filter and a second tunable TX bandpass filter wherein the front end circuit is configured to support a TDD interband carrier aggregation mode wherein a signal is received simultaneously in the first TDD frequency band and in an aggregated TDD frequency band, wherein the second tunable RX bandpass filter is optimized to the aggregated TDD frequency band in the TDD interband carrier aggregation mode.

Thus, the front end circuit allows to support TDD interband carrier aggregation with a minimal number of components. Moreover, the same front end circuit may be used to support FDD carrier band aggregation. In FDD carrier band aggregation, a signal is received simultaneously in a first FDD frequency band and in an aggregated frequency band.

Furthermore, in the TDD interband carrier aggregation mode, one of the first tunable RX bandpass filter and the first tunable TX bandpass filter may be optimized to the first TDD frequency band and the other of the first tunable RX bandpass filter and the first tunable TX bandpass filter may be detuned such that it does not have a passband in the first TDD frequency band.

According to a second aspect, the present invention concerns a method of operating a front end circuit wherein the front end circuit comprises a tunable duplexer comprising a first tunable RX bandpass filter and a first tunable TX bandpass filter, the method comprising the steps of:
  determining a mode of operation,
  if the mode of operation is a first FDD mode in a first FDD frequency band, tuning the first tunable RX bandpass filter and the first tunable TX bandpass filter to the first FDD frequency band,
  if the mode of operation is a first TDD mode in a first TDD frequency band, tuning one of the first tunable RX bandpass filter and the first tunable TX bandpass filter to the first TDD frequency band and detuning the other one of the first tunable RX bandpass filter and the first tunable TX bandpass filter away from the first TDD frequency band such that it does not have a passband in the first TDD frequency band.

In particular, in a TX mode of the first TDD frequency band, the first tunable TX bandpass filter is tuned to the first TDD frequency band and the first tunable RX bandpass filter is detuned. In a RX mode of the first TDD frequency band, the first tunable RX bandpass filter is tuned to the first TDD frequency band and the first tunable TX bandpass filter is detuned.

In particular, the method may be used for operating a front end circuit according to present claim 1 or according to one of the preferred embodiments described above. Thus, every structural and functional feature disclosed with respect to said front end circuit may also apply with respect to the method and vice versa.

The method provides the advantage that it requires only a minimal number of filters for operating in FDD and TDD modes in different frequency regions.

If the mode of operation is a first TDD mode in a first TDD frequency band, for sending signals in a TX mode of the first TDD mode, the method may comprises the step of tuning the first tunable TX bandpass filter to the first TDD frequency band and detuning the tunable RX bandpass filter away from the first TDD frequency band such that it does not have a passband in the first TDD frequency band. Further, for receiving signals in a RX mode of the first TDD mode, the method may comprise the step of tuning the first tunable RX bandpass filter to the first TDD frequency band and detuning the tunable TX bandpass filter away from the first TDD frequency band such that it does not have a passband in the first TDD frequency band.

If the mode of operation is a second FDD mode in a second FDD frequency band, for sending and receiving signals, the method may comprise the step of tuning the first tunable RX bandpass filter and the first tunable TX bandpass filter to the second FDD frequency band.

If the mode of operation is a second TDD mode in a second TDD frequency band, for sending and receiving signals, the method may comprise the step of tuning one of the first tunable RX bandpass filter and the first tunable TX bandpass filter to the second TDD frequency band and detuning the other one of the first tunable RX bandpass filter and the first tunable TX bandpass filter away from the second TDD frequency band such that it does not have a passband in the second TDD frequency band.

In particular, in the second TDD mode, the method may be configured such that the first tunable TX filter and the first tunable RX filter are never tuned to the same bandpass simultaneously.

The front end circuit may further comprise a second tunable duplexer comprising a second tunable RX bandpass filter and a second tunable TX bandpass filter. If the mode of operation is a TDD interband carrier aggregation mode wherein a signal is received simultaneously in the first TDD frequency band and in an aggregated TDD frequency band, the method may comprise the steps of tuning the second tunable RX bandpass filter to the aggregated TDD frequency band and tuning one of the first tunable RX bandpass filter and the first tunable TX bandpass filter to the first TDD frequency band and detuning the other one of the first tunable RX bandpass filter and the first tunable TX bandpass filter away from the first TDD frequency band such that it does not have a passband in the first TDD frequency band.

In the following, the present invention is described in further detail with reference to the drawings.

Figure 2:
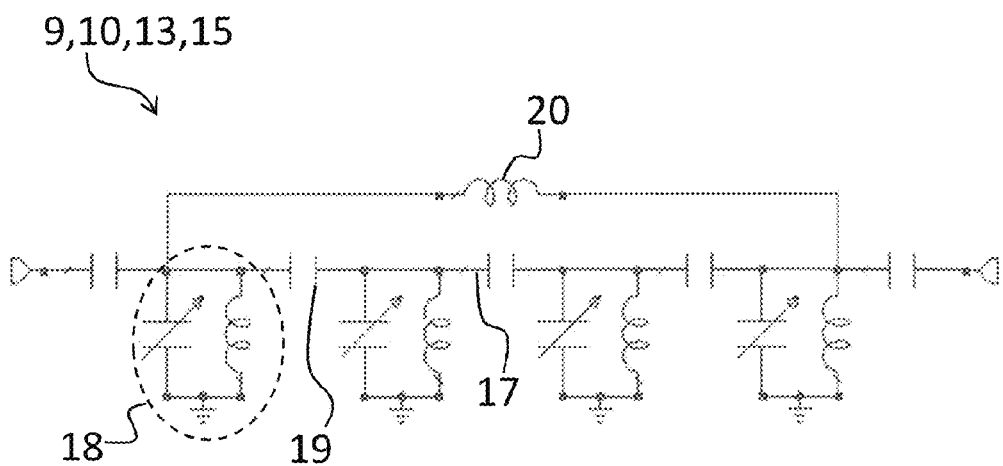
Figure 3:
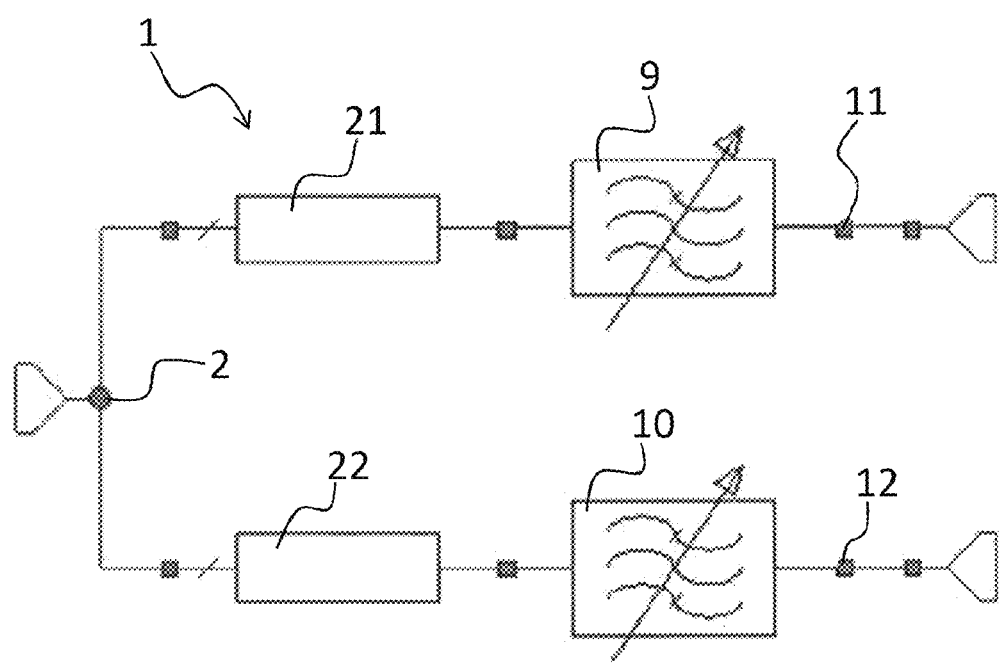
Figure 4:
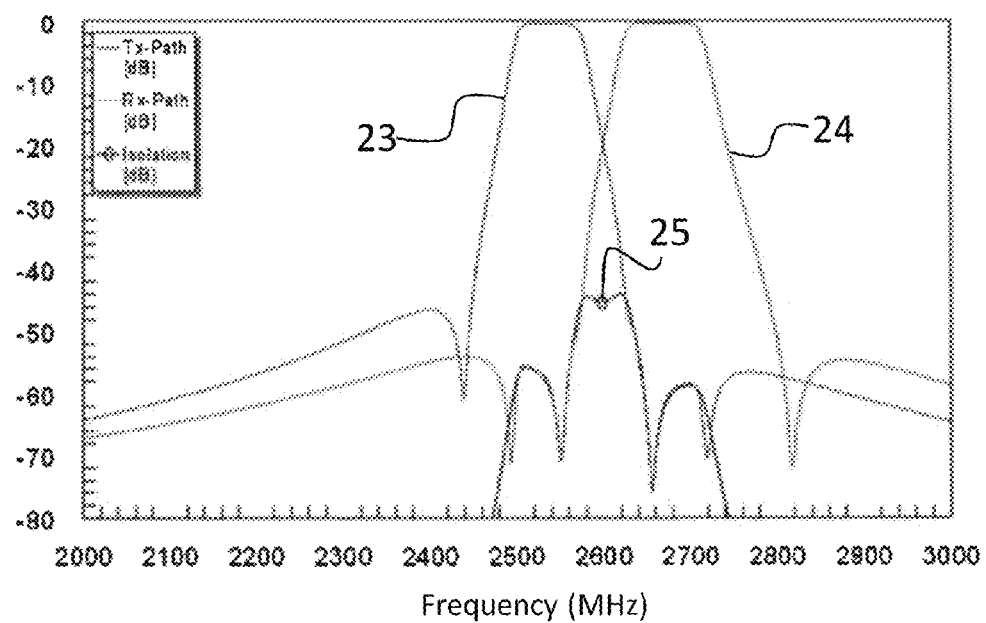
Figure 5:
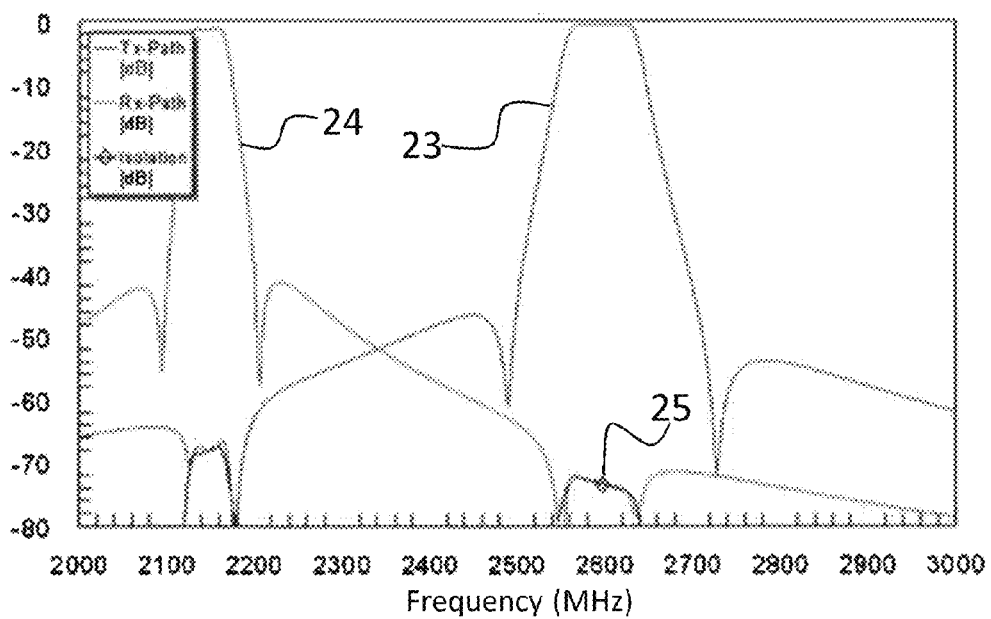
Figure 6:
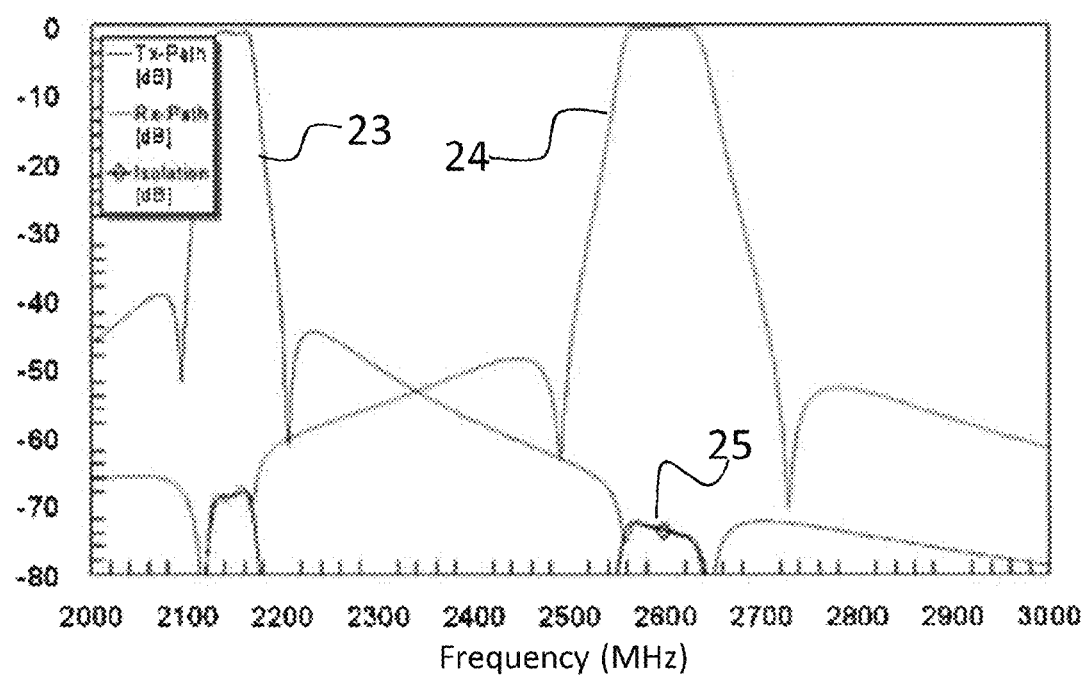
Figure 7:
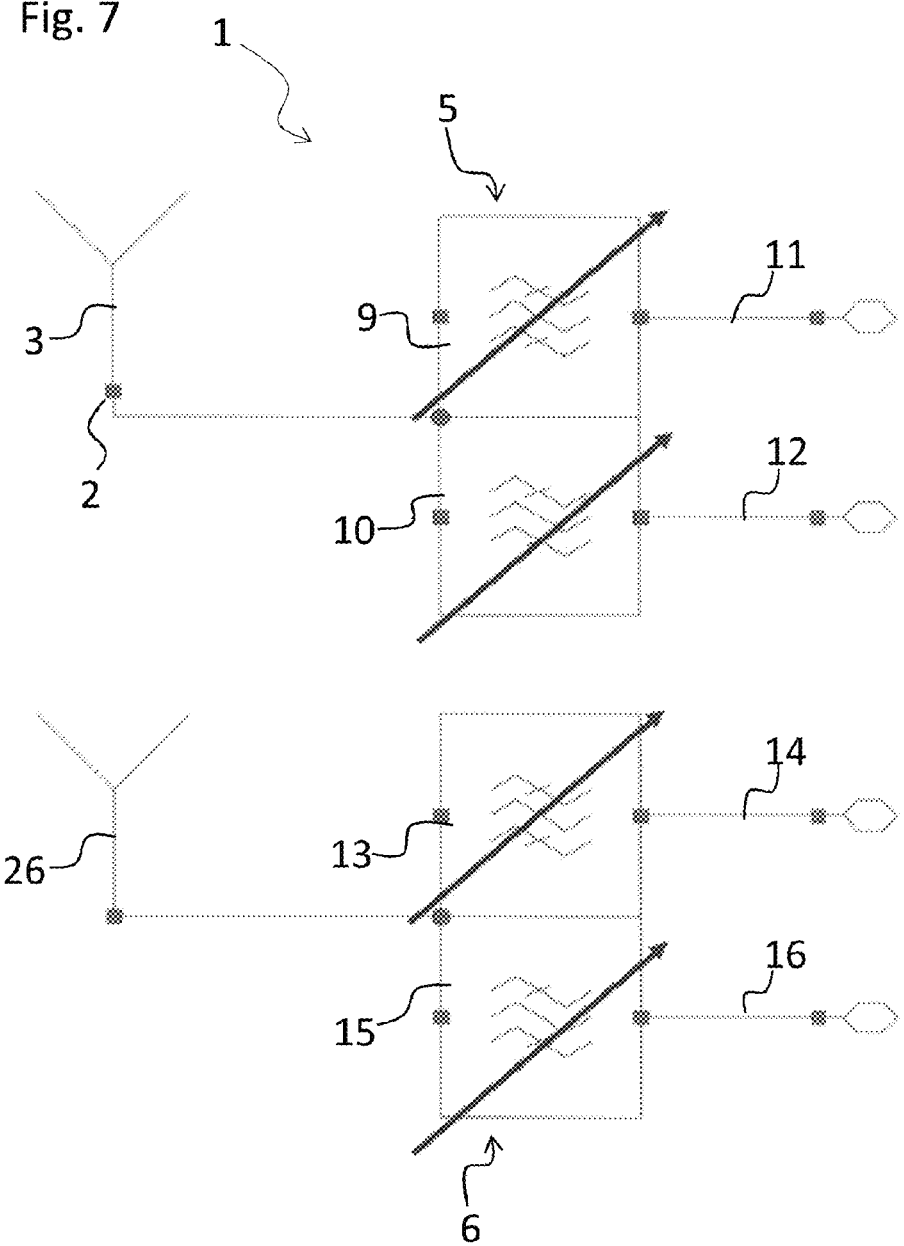

FIG. 1 shows a first embodiment of a front end circuit;
FIG. 2 shows a simplified topology of a tunable filter;
FIG. 3 shows a second embodiment of a front end circuit;
FIG. 4 shows the frequency characteristic of a front end circuit in a FDD setting;
FIG. 5 shows the frequency characteristic of a front end circuit in a TX mode of a TDD setting;
FIG. 6 shows the frequency characteristic of a front end circuit in a RX mode of a TDD setting; and
FIG. 7 shows a third embodiment of the front end circuit.

FIG. 1 shows a first embodiment of a front end circuit 1. The front end circuit 1 comprises an antenna port 2 which is connected to a first antenna 3. The front end circuit 1 is configured for sending and receiving signals in different frequency bands.

The front end circuit 1 comprises a diplexer 4, a first tunable duplexer 5 and a second tunable duplexer 6. The diplexer 4 comprises a high-pass filter 7 and a low-pass filter 8. The diplexer 4 is directly connected to the antenna port 2.

The diplexer 4 provides a rough separation of received signals. The high-pass filter 7 of the diplexer 4 is configured such that it allows signals to pass having a frequency in the region of 1.7 to 2.7 GHz. Alternatively, the high-pass filter 7 of the diplexer 4 may be configured such that it allows signals to pass having a frequency in the region of or of 1.7 to 2.2 GHz. In particular, the high-pass filter 7 may have a cutoff frequency of 1500 MHz such that signals having a frequency lower than the cutoff frequency are attenuated by the high-pass filter 7 and signals having a frequency higher than the cutoff frequency pass through the high-pass filter 7 without being attenuated significantly. For example, the high-pass filter 7 may allow signals to pass in the LTE frequency bands I, III, IV and VII.

Further, the low-pass filter 8 is configured such that it allows signals to pass having a frequency in the vicinity of the 1 GHz region. In particular, the low-pass filter 8 may have a cutoff frequency of 1000 MHz such that signals having a frequency higher than the cutoff frequency are attenuated by the low-pass filter 8 and signals having a frequency lower than the cutoff frequency pass through the low-pass filter 8 without being attenuated significantly. For example, the low-pass filter 8 may allow signals to pass from LTE frequency bands V, VIII, XII, XIII, XVII and XX.

The high-pass filter 7 is connected to the first tunable duplexer 5. The first tunable duplexer 5 comprises a first tunable RX bandpass filter 9 and a first tunable TX bandpass filter 10. The first tunable RX bandpass filter 9 is connected to a first RX signal path 11. Further, the first tunable TX bandpass filter 10 is connected to a first TX signal path 12.

The first tunable RX bandpass filter 9 and the first tunable TX bandpass filter are configured such that their respective passband can be varied. In particular, the first tunable RX bandpass filter 9 and the first tunable TX bandpass filter 10 are configured such that their respective passband can be optimized to different frequency bands. For this purpose, each of the first tunable RX bandpass filter 9 and the first tunable TX bandpass filter 10 comprises at least one tunable element, e.g. a tunable capacitor.

When the front end circuit 1 is operated at a specific frequency band in the 1.7-2.7 GHz region or in the 1.7-2.2 GHz region, the first tunable duplexer 5 can be optimized to this frequency band. In particular, in a FDD mode, the specific frequency band has a specific RX passband and a specific TX passband.

The first tunable duplexer 5 is configured such that, in this mode of operation, the passband of the first tunable RX bandpass filter 9 is tuned such that it is optimized to the specific RX passband and that the passband of the first tunable TX filter 10 is tuned such that it is optimized to the specific TX passband. Thus, it is possible to tune the first tunable duplexer 5 such that signals having frequencies in the specific frequency band are not attenuated by the first tunable duplexer 5 whereas signals having frequencies outside the specific frequency band are suppressed by the first tunable duplexer 5.

In particular, the first tunable RX bandpass filter 9 and the first tunable TX bandpass filter 10 can be optimized to each of the frequency bands in the passband region of the high-pass filter 7 of the diplexer 4.

Moreover, the low-pass filter 8 of the diplexer 4 is connected to the second tunable duplexer 6. The second tunable duplexer 6 comprises a second tunable RX bandpass filter 13 which is connected to a second RX signal path 14 and a second tunable TX bandpass filter 15 which is connected to a second TX signal path 16. The second tunable RX bandpass filter 13 and the second tunable TX bandpass filter 15 are configured to be optimized to different frequency bands in the vicinity of the 1 GHz region. In particular, the second tunable RX bandpass filter 13 and the second tunable TX bandpass filter 15 can be optimized to each of the frequency bands in the passband region of the low-pass filter 8 of the diplexer 4.

Thus, as the first tunable duplexer 5 can be optimized to each of the frequency bands in the passband of the high-pass filter 7 and the second tunable duplexer 6 can be optimized to each frequency band in the passband of the low-pass filter 8, the front end circuit 1 comprising only said two tunable duplexers 5, 6 allows for sending and receiving in a very large number of frequency bands.

In an alternate embodiment, the front end circuit 1 comprises only one tunable duplexer comprising a tunable RX bandpass filter and a tunable TX bandpass filter which are tunable such that they can be tuned to any frequency band in the 1 GHz region and in the 1.7-2.7 GHz region or the 1.7-2.2 GHz region. In this embodiment the tunable duplexer is configured such that it can be optimized to any LTE frequency band.

The front end circuit 1 supports different types of modes. As already mentioned, the front end circuit 1 supports FDD duplexing. In the FDD mode, the front end circuit 1 simultaneously sends TX signals and receives RX signals. For a specific FDD frequency band, the TX signals have frequencies in the specific TX frequency band and the RX signals have frequencies in the specific RX frequency band wherein the specific RX frequency band is different from the specific TX frequency band.

In a FDD duplexing mode using a specific frequency band in the passband of the high-pass filter 7, the first tunable duplexer 5 is tuned such that the first tunable TX bandpass filter 10 is optimized to the specific TX frequency band and the first tunable RX bandpass filter 9 is optimized to the specific RX frequency band. Thus, the signals are processed correctly. A RX signal having a frequency in the specific RX frequency band and being received at the first antenna 3 passes through the high-pass filter 7 and through the first tunable RX bandpass filter 9 such that it is coupled to the first RX signal path 11. A TX signal coupled to the first TX signal pass 12 and having a frequency in the specific TX frequency band passes through the first tunable TX bandpass filter 10 and the high-pass filter 7 such that it is transmitted by the first antenna 3.

As an example, the front end circuit 1 is considered when operating at band VII which has a TX band at 2,500-2,570 MHz and a RX band at 2,620-2,690 MHz in a FDD mode. In this case, the first tunable duplexer 5 connected to the high-pass filter 7 of the diplexer 4 is active. Further, the first tunable TX bandpass filter 10 is tuned so that its passband overlaps with the TX band of the used frequency band, i.e. the first tunable TX bandpass filter 10 is tuned such that it has its passband at 2,500-2,570 MHz in this case. Further, the first tunable RX filter 9 is tuned so that its passband overlaps with the RX band of the used frequency band, i.e. the first tunable RX filter 9 is tuned such that it has its passband at 2,620-2,690 MHz. Alternatively, the first tunable TX filter 10 could have a passband centred on the used channel.

If the front end circuit 1 then needs to change to operate at another frequency band, e.g. at band III which has a TX band at 1,710-1,785 MHz and a RX band at 1,805-1,880 MHz, the same bandpass filters 9, 10 are used. In this case, the first tunable RX bandpass filter 9 and the first tunable TX bandpass filter 10 are tuned such that they are optimized to the RX band and, respectively, the TX band of the used frequency band. In this case, they are tuned such that the first tunable TX bandpass filter 10 has a passband at 1,710-1,785 MHz and the first tunable RX passband filter 9 has a passband at 1,805-1,880 MHz.

Furthermore, the same tunable bandpass filters 9, 10 can utilized in a TDD mode. In the TDD mode the front end circuit 1 alternates between transmitting and receiving signals at the same frequency band. The present front end circuit 1 is enabled to support TDD duplexing at different frequency bands. As an example, for sending signals in a specific frequency band that lies in the passband of the high-pass filter 7, the first tunable TX bandpass filter 10 is tuned to the specific frequency band and the first tunable RX bandpass filter 9 is detuned such that its passband is far away from the specific frequency band. Thus, signals having a frequency in the specific frequency band are strongly attenuated by the first tunable RX bandpass filter 9.

Similarly, for receiving signals in the specific frequency band that lies in the passband of the high-pass filter 7, the first tunable RX bandpass filter 9 is tuned to the specific frequency band and the first tunable TX bandpass filter 10 is detuned such that its passband is far away from the specific frequency band. Thus, signals having a frequency in the specific frequency band are strongly attenuated by the first tunable TX bandpass filter 10.

Analogously, for sending and receiving signals in a specific frequency band that lies in the passband of the low-pass filter 8, one of the second tunable RX bandpass filter 13 and the second tunable TX bandpass filter 15 is tuned to the specific frequency band and the other one of said bandpass filters 13, 15 is detuned such that its passband is far away from the specific frequency band.

As an example, TDD duplexing in band 38 is considered which corresponds to the frequencies 2570-2620 MHz. When the front end circuit 1 is operated in a sending mode in band 38, the first tunable TX bandpass filter 10 is tuned so that it has its passband at 2,570-2,620 MHz allowing the signal coming from the first TX signal path 12 to be connected to the first antenna 3. At the same time, the first tunable RX bandpass filter 9 is detuned on purpose so that it does not have a passband near 2,570-2,620 MHz, instead only showing high reflectivity at this frequency band.

When the front end circuit 1 is receiving signals in the RX mode of the TDD mode, the first tunable TX bandpass filter 10 is detuned and the first tunable RX bandpass filter 9 is tuned such that it has its passband at 2,570-2,620 MHz, allowing a signal received by the first antenna 3 to be connected to the first RX signal path 11.

Thus, the proposed front end circuit 1 allows the support of both FDD and TDD-modes on various frequency bands by utilizing tunable filters 9, 10, 13, 15 for both FDD and TDD-type operations.

The front end circuit 1 shown in FIG. 1 is further configured to support interband carrier aggregation of TDD modes with simultaneous RX in an aggregated band. In the interband carrier aggregation mode, a signal is received in a first frequency band and simultaneously in an aggregated frequency band. In the first frequency band, a TDD duplexing is used such that sending TX signals and receiving RX signals alternate in the first frequency band. The aggregated frequency band is used for received RX signals only.

In the interband carrier aggregation mode, the front end circuit 1 is configured such that one of the first and the second tunable duplexer 5, 6 is operated in the TDD duplexing mode to alternatingly send and receive the signal in the first frequency band.

As an example, then first tunable duplexer 5 may be operated in the TDD duplexing mode to alternatingly send and receive the signal in the first frequency band. In particular, one of the first tunable TX bandpass filter 10 and the first tunable RX bandpass filter 9 is tuned to the first frequency band and the other one of the first tunable TX bandpass filter 10 and the first tunable RX bandpass filter 9 is detuned on purpose such that its passband is far away from the first frequency band in this case.

More particular, for sending signals, the first tunable TX bandpass filter 10 is tuned to the first frequency band and the first tunable RX bandpass filter 9 is detuned on purpose. For receiving signals, the first tunable RX bandpass filter 9 is tuned to the first frequency band and the first tunable TX bandpass filter 10 is detuned on purpose.

The other one of the first and second tunable duplexer 5, 6 is utilized as RX filter for the signal in the aggregated frequency band. In the above discussed example, the second tunable duplexer 6 is utilized as RX filter. In this case, the second tunable RX bandpass filter 13 of the second tunable duplexer 6 is optimized to the aggregated frequency band and the second tunable TX bandpass filter 15 of the second tunable duplexer 6 is detuned.

However, it is also possible that the second tunable duplexer 6 is operated in TDD duplexing mode for the signal in the first frequency band and that the first tunable duplexer 5 is utilized as RX filter.

As an example, the interband carrier aggregation is considered using a band combination of band 39 as first frequency band and band 41 as aggregated frequency band. In this case, the first tunable RX bandpass filter 9 and the first tunable TX bandpass filter 10 can alternatingly be tuned to band 39 according to the TX/RX timing of the signal and the second tunable RX bandpass filter 13 can be tuned to the passband of the aggregated frequency band, i.e. band 41.

However, in this example, a diplexer has to be used which as a different cut-off frequency as the previously discussed diplexer. In particular, a diplexer is chosen which is enabled to separate a signal having a frequency in band 41 and a signal having a frequency in band 39. Thus, to support interband carrier aggregation of TDD modes with simultaneous RX in an aggregated band a diplexer is used which is configured to separate the main band and the aggregated band.

FIG. 2 shows an example of a tunable bandpass filter 9, 10, 13, 15. The filter 9, 10, 13, 15 comprises inductors and capacitors wherein at least one inductor or one capacitor is tunable. In particular, the filter 9, 10, 13, 15 comprises a main path 17 wherein coupled LC resonators 18 are arranged along the main path 17. Moreover, a coupling capacitor 19 is arranged between each pair of two LC resonators 18. Furthermore, the filter 9, 10, 13, 15 comprises a coupling inductor 20 arranged in a path parallel to the main path 17 and bridging the filter 9, 10, 13, 15.

In particular, each LC resonator 18 comprises a tunable capacitor. The filter 9, 10, 13, 15 comprises high-Q resonators realized using high-Q inductors (Q>100) and high-Q capacitors (Q>150). The capacitors are realized as tunable elements and the inductors have a fixed value. The coupling capacitors can have a moderate Q lower than 100 and the same applies for the coupling inductor. The coupling inductor 20 provides the transmission zeros to left and right of the passband.

The tunable bandpass filter 9, 10, 13, 15 shown in FIG. 2 is only an example of a realization of a tunable filter. In particular, different topologies can also be used to realize a tunable filter 9, 10, 13, 15. Moreover, some or all of the coupling capacitors 19 could be tunable as well. Additionally or alternatively, the filter 9, 10, 13, 15 could utilize tunable or reconfigurable acoustic elements.

FIG. 3 shows a front end circuit 1 wherein a tunable RX bandpass filter 9 and a tunable TX bandpass filter 10, both of the type shown in FIG. 2, are connected to form two passbands.

The front end circuit 1 shown in FIG. 3 further comprises a first phase shifter 21 and a second phase shifter 22. The first phase shifter 21 is connected between the antenna port 2 and the first tunable RX bandpass filter 9 and the second phase shifter 22 is connected between the antenna port 2 and the first tunable TX bandpass filter 10. The phase shifters 21, 22 are used to match the two tunable bandpass filters 9, 10 properly. The phase shifters 21, 22 do not need to be tunable or reconfigurable. Instead, the phase shifters 21, 22 are realized using a fixed network.

However, each of the first and the second phase shifter 21, 22 is an optional element which may be omitted in the front end circuit 1.

FIG. 4 shows a diagram showing the frequency characteristic of the front end circuit 1 comprising the first tunable duplexer 5 wherein the first tunable duplexer 5 is set to a first setting. In the first setting, the FDD duplexing in band VII is used. Thus, the first tunable TX bandpass filter 10 is tuned such that its passband is corresponding to the TX band of the band VII. Further, the passband of the first tunable RX bandpass filter 9 is tuned such that its passband corresponds to the RX band of band VII. Graph 23 is the attenuation in the first TX signal path 12. Graph 24 is the attenuation in the first RX signal path 11. Moreover, the isolation between the first TX signal path 12 and the first RX signal path 11 is shown by graph 25 in FIG. 4.

FIG. 5 shows the frequency characteristic of the front end circuit 1 wherein the first tunable duplexer 5 is in a second setting corresponding to the front end circuit 1 operating in TDD duplexing in band 38 in the TX mode. As described above, the first tunable TX bandpass filter 10 is set to the corresponding TX passband and the first tunable RX bandpass filter 9 is strongly detuned to avoid any coupling between TX and RX. Again, Graph 23 gives the attenuation in the first TX signal path 12 and graph 24 shows the attenuation in the first RX signal path 11. Moreover, the isolation between the two paths is shown by graph 25 in FIG. 5.

FIG. 6 shows the corresponding setting for TDD duplexing in band 38 in the RX mode. Now the first tunable TX bandpass filter 10 is detuned and the first tunable RX bandpass filter 9 is optimized to the used RX frequency band. Again, graph 23 gives the attenuation in the first TX signal path 12 and graph 24 shows the attenuation in the first RX signal path 11. Moreover, the isolation between the two paths 11, 12 is shown by graph 25 in FIG. 6.

FIG. 7 shows a third embodiment of the front end circuit 1. The third embodiment shown in FIG. 7 differs from the first embodiment shown in FIG. 1 as the third embodiment does not comprise a diplexer 4. Instead, the third embodiment comprises the first antenna 3 and, additionally, a second antenna 26. The first tunable duplexer 5 is connected to the first antenna 3 and the second tunable duplexer 6 is connected to the second antenna 26.

REFERENCE NUMERALS 1 front end circuit
2 antenna port
3 first antenna
4 diplexer
5 first tunable duplexer
6 second tunable duplexer
7 high-pass filter
8 low-pass filter
9 first tunable RX bandpass filter
10 first tunable TX bandpass filter
11 first RX signal path
12 first TX signal path
13 second tunable RX bandpass filter
14 second RX signal path
15 second tunable TX bandpass filter
16 second TX signal path
17 main path
18 LC resonators
19 coupling capacitor
20 coupling inductor
21 first phase shifter
22 second phase shifter
23 attenuation in the first TX signal path
24 attenuation in the first RX signal path
25 isolation between the first TX signal path and the first RX signal path
26 second antenna

We claim:

1. A front end circuit, comprising:
a first tunable duplexer comprising a first tunable RX bandpass filter and a first tunable TX bandpass filter; and
a second tunable duplexer comprising a second tunable RX bandpass filter and a second tunable TX bandpass filter,
wherein the first tunable duplexer is configured to support a first FDD mode in a first FDD frequency band and a first TDD mode in a first TDD frequency band,
wherein the front end circuit is configured to support a TDD interband carrier aggregation mode wherein a signal is received simultaneously in the first TDD frequency band and in an aggregated TDD frequency band, and
wherein the second tunable RX bandpass filter is tuned to the aggregated TDD frequency band in the TDD interband carrier aggregation mode.

2. The front end circuit according to claim 1, wherein, in the first TDD mode, the first tunable duplexer is configured to alternate between a TX setting and a RX setting.

3. The front end circuit according to claim 2,
wherein, in the RX setting, the first tunable RX bandpass filter is tuned to the first TDD frequency band, and
the first tunable TX bandpass filter is detuned such that it does not have a passband in the first TDD frequency band.

4. The front end circuit according to claim 2,
wherein, in the TX setting, the first tunable TX bandpass filter is tuned to the first TDD frequency band, and
the first tunable RX bandpass filter is detuned such that it does not have a passband in the first TDD frequency band.

5. The front end circuit according to claim 1, wherein the first tunable duplexer is configured such that, in the first FDD mode, the first tunable RX bandpass filter and the first tunable TX bandpass filter is tuned to the first FDD frequency band.

6. The front end circuit according to claim 1, wherein the first tunable duplexer is configured to support at least a second FDD mode in a second FDD frequency band.

7. The front end circuit according to claim 1, wherein the first tunable duplexer is configured to support at least a second TDD mode in a second TDD frequency band.

8. The front end circuit according to claim 1, wherein, in the TDD interband carrier aggregation mode, one of the first tunable RX bandpass filter and the first tunable TX bandpass filter is tuned to the first TDD frequency band and the other of the first tunable RX bandpass filter and the first tunable TX bandpass filter is detuned such that it does not have a passband in the first TDD frequency band.

9. A method of operating a front end circuit, wherein the front end circuit comprises a first tunable duplexer comprising a first tunable RX bandpass filter and a first tunable TX bandpass filter and a second tunable duplexer comprising a second tunable RX bandpass filter and a second tunable TX bandpass filter, the method comprising the steps of:
  determining a mode of operation,
  if the mode of operation is a first FDD mode in a first FDD frequency band, tuning the first tunable RX bandpass filter and the first tunable TX bandpass filter to the first FDD frequency band,
  if the mode of operation is a first TDD mode in a first TDD frequency band, tuning one of the first tunable RX bandpass filter and the first tunable TX bandpass filter to the first TDD frequency band and detuning the other one of the first tunable RX bandpass filter and the first tunable TX bandpass filter away from the first TDD frequency band such that it does not have a passband in the first TDD frequency band, and
  if the mode of operation is a TDD interband carrier aggregation mode wherein a signal is received simultaneously in the first TDD frequency band and in an aggregated TDD frequency band, tuning the second tunable RX bandpass filter to the aggregated TDD frequency band and tuning one of the first tunable RX bandpass filter and the first tunable TX bandpass filter to the first TDD frequency band and detuning the other one of the first tunable RX bandpass filter and the first tunable TX bandpass filter away from the first TDD frequency band such that it does not have a passband in the first TDD frequency band.

10. The method according to claim 9,
wherein if the mode of operation is a first TDD mode in a first TDD frequency band:
  for sending signals in a TX mode of the first TDD mode, the method comprises the step of:
    tuning the first tunable TX bandpass filter to the first TDD frequency band, and
    detuning the tunable RX bandpass filter away from the first TDD frequency band such that it does not have a passband in the first TDD frequency band, and
  for receiving signals in a RX mode of the first TDD mode, the method comprises the step of:
    tuning the first tunable RX bandpass filter to the first TDD frequency band and detuning the tunable TX bandpass filter away from the first TDD frequency band such that it does not have a passband in the first TDD frequency band.

11. The method according to claim 9, wherein if the mode of operation is a second FDD mode in a second FDD frequency band, for sending and receiving signals, the method comprises the step of:
  tuning the first tunable RX bandpass filter and the first tunable TX bandpass filter to the second FDD frequency band.

12. The method according to claim 9, wherein if the mode of operation is a second TDD mode in a second TDD frequency band, for sending and receiving signals, the method comprises the step of:
  tuning one of the first tunable RX bandpass filter and the first tunable TX bandpass filter to the second TDD frequency band and detuning the other one of the first tunable RX bandpass filter and the first tunable TX bandpass filter away from the second TDD frequency band such that it does not have a passband in the second TDD frequency band.

13. The method according to claim 9,
wherein the front end circuit comprises a first phase shifter and a second phase shifter,
wherein the first phase shifter is connected between an antenna port and the first tunable RX bandpass filter, and
wherein the second phase shifter is connected between the antenna port and the first tunable TX bandpass filter.

14. The method according to claim 13,
wherein the first and the second phase shifter are realized using a fixed, not tunable network.

15. The front end circuit according to claim 1,
wherein the front end circuit comprises a first phase shifter and a second phase shifter, wherein the first phase shifter is connected between an antenna port and the first tunable RX bandpass filter, and
wherein the second phase shifter is connected between the antenna port and the first tunable TX bandpass filter.

16. The front end circuit according to claim 15, wherein the first and the second phase shifter are realized using a fixed, not-tunable network.

17. A front end circuit, comprising:
  a first tunable duplexer comprising a first tunable RX bandpass filter and a first tunable TX bandpass filter,
  wherein the first tunable duplexer is configured to support a first FDD mode in a first FDD frequency band and a first TDD mode in a first TDD frequency band,
  further comprising a second tunable duplexer comprising a second tunable RX bandpass filter and a second tunable TX bandpass filter,
  wherein the front end circuit is configured to support a TDD interband carrier aggregation mode wherein a signal is received simultaneously in the first TDD frequency band and in an aggregated TDD frequency band, wherein the second tunable TX bandpass filter is tuned to the aggregated TDD frequency band in the TDD interband carrier aggregation mode.

* * * * *